United States Patent Office 3,529,061
Patented Sept. 15, 1970

3,529,061
COMPOSITION AND METHOD FOR PROTECTING MICE FROM IONIZING RADIATION
David Norman, Redondo Beach, and Robert D. Schultz, Whittier, Calif., assignors to North American Rockwell Corporation, a corporation of Delaware
Filed May 25, 1964, Ser. No. 369,975
Int. Cl. A61k 27/00; A61l 23/00
U.S. Cl. 424—274
8 Claims

ABSTRACT OF THE DISCLOSURE

Compositions are described comprising suspensions of carbinol analogues of plant growth regulators in pharmaceutical aqueous media. In particular, the compounds include beta-indolyl-3-ethanol, 2,3,5-triiodobenzyl alcohol and 2,4,5-trichlorophenoxy-ethanol. The aqueous pharmaceutical mixtures of these materials are intraperitoneally injected into mice which are subsequently exposed to gamma radiation in a dose greater than the lethal dose for untreated animals. A substantial fraction of the irradiated subjects were protected from the normally lethal dose of radiation. In addition, the animals are also deeply anesthetized by injection of the carbinol analogues of the plant growth regulators.

Figure 1:
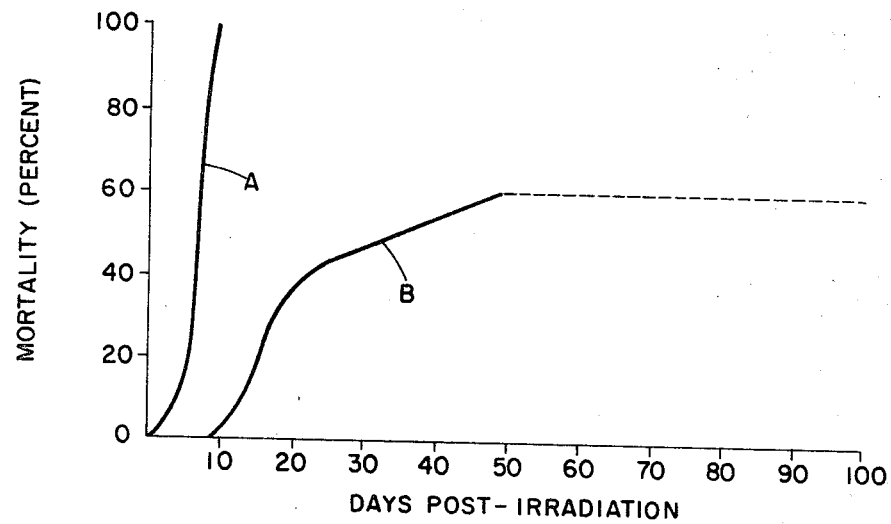

When animals are subjected to ionizing radiation it is well known that biochemical damage occurs leading to a pathological condition known as radiation sickness. If a sufficient dose of ionizing radiation is involved it is lethal to the animals. Because of the possibility of accidental exposure to high doses of ionizing radiation and the intentional exposure to X-rays for scientific experimentation, it is desirable to have available a means for minimizing the biological effects of radiation.

It is therefore a broad object of this invention to provide radiation protection.

It is a further object of this invention to provide new compositions of matter which are effective in affording radiation protection.

Thus in the practice of this invention according to a preferred embodiment there is provided a treatment for warm blooded animals which effects a protection against ionizing radiation comprising the administration of an aqueous admixture of a carbinol analogue of a compound having an unsaturated ring system having from one to two fused rings as the nucleus and also having a side chain possessing a carboxyl group termination and a total of from one to eight carbon atoms in the side chain. Carbinol analogues of compounds having more than eight carbon atoms in the side chain apparently require metabolism to shorter chains for optimum effectiveness. In addition the carboxylic acid analogues of compounds useful in the practice of this invention having this molecular structure also have a spatial relationship between the ring system and the carboxyl group so that the compounds are classed as plant growth regulators in a conventional bioassay for auxin activity.

Plant growth regulators are organic compounds, other than nutrients, that in small amounts promote, inhibit or otherwise modify plant growth. Some compounds having molecular structures other than those defined above also show plant growth regulation activity. The term auxin is used herein as a generic term for compounds characterized by their capacity to induce elongation in plant cells such as shoots or roots. Some of the compounds have selective activity on roots and retard elongation of shoots or prevent elongation of shoots in the presence of shoot auxins. These are often classed as anti-auxins or auxin antagonists because of the competitive action with shoot auxins in some bioassays. Many of the compounds exhibiting growth regulation activity act as shoot auxins in some concentrations, as root auxins in other concentrations and are phyto-toxic in still other concentrations.

Several bioassay techniques are employed in determining auxin activity and are amply described in the literature. Accepted bioassays include the Avena test, split pea test, *Avena coleoptile* straight growth test, pea coleoptile straight growth test, pea root test, root inhibition tests, leaf repression test, tomato ovary test, tomato petiole epinasty test, wheat coleoptile straight growth test and the like.

A carbinol analogue of the defined carboxylic acid is related to the acid in that the doubly bonded oxygen of the carboxyl group is absent and two hydrogen atoms are provided in place thereof. The carbinol analogue of the carboxylic acid is preferred in that this is the least change in the side chain of the molecule that can be made to make the compound not a plant growth regulator. It should be noted that the change of two hydrogens in place of the doubly bonded oxygen makes very little change in the steric configuration of the molecule. Thus, for example, the natural auxin indolyl-3-acetic acid,

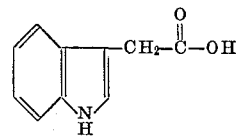

has the carbinol analogue beta-indolyl-3-ethanol,

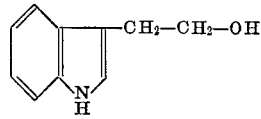

where the carbinol group, CH$_2$OH, is present rather than the carboxyl group, COOH.

Compounds that are included in the practice of this invention include carbinol analogues of benzoic acid, 1-naphthoic acid, phenylacetic acid, cinnamic acid, phenoxyacetic acid, alpha-phenoxyisobutyric acid, phenyl-sulfide acetic acid, and indolyl-3-acetic acid and substituted derivities of these acids. Compounds that are preferred for use in the practice of this invention include the carbinol analogues of the plant growth regulators: 2,5-dichloro-benzoic acid; 2,6-dichlorobenzoic acid; 3-chloro-2-iodo-benzoic acid; 2,3,6-trichloro-4-fluoro-benzoic acid; 2,6 - dichloro-4-fluoro-3-nitro-benzoic acid; 3 - chloro - 2-ethyl-benzoic acid; 2,3,6 - chloro-benzoic acid; 2,3,5-triiodo-benzoic acid; 2,6-dichloro - 3-nitro-benzoic acid; 2,6-dimethyl - 3-chloro-benzoic acid; 2,6-dimethyl-6-bromo-benzoic acid; 2,6-dimethyl-6-iodo-benzoic acid; 2-chloro-1-naphthoic acid; 8-chloro-1-naphthoic acid; 8-bromo-1-naphthoic acid; 8-iodo - 1-naphthoic acid; 8-methyl-1-naphthoic acid: 2,4-dichloro-phenylacetic acid; 1-naphthaleneacetic acid; 2-chloro-1-naphthaleneacetic acid; cis-cinnamic acid; cis-2-methoxycinnamic acid; cis-4-methyl-cinnamic acid; 3-chloro-phenoxyacetic acid; 4-chloro-phenoxyacetic acid; 2,4-difluoro-phenoxyacetic acid; 2,3-dichloro-phenoxyacetic acid; 2,4-dichlorophenoxyacetic acid (2,4-D); 2,5 - dichloro-phenoxyacetic acid; 3,4-dichlorophenoxyacetic acid; 2,4 - dibromo-phenoxyacetic acid; 2,3,4-trichloro-phenoxyacetic acid; 2,4,5-trichloro-phenoxyacetic acid; 2,4-dichloro - 6-fluoro-phenoxyacetic acid; 2,4-dibromo - 6-fluoro-phenoxyacetic acid; 2,4-dimethyl-phenoxyacetic acid; 4-chloro - 2-methyl-phenoxyacetic acid; 2-naphthoxyacetic acid; 3-chloro-2-naphthoxyacetic acid; 6-chloro-2-naphthoxyacetic acid; 8-chloro-2-naphthoxyacetic acid; alpha-phenoxyisobutyric acid; 2,4,5-trichloro-alpha-phenoxyisobutyric acid; indolyl-3-acetic acid; 5-fluoro-indolyl-3-acetic acid; 4-chloro-indolyl-3-acetic acid; 5-chloro-indolyl - 3-acetic acid; 6-chloro-indolyl-3-acetic acid; 7-chloro-indolyl - 3-acetic acid; 5-methyl-indolyl-3-acetic acid; 5-methoxy-indolyl - 3-acetic acid; 6-methoxy-indolyl-3-acetic acid, D,L-alpha-indolyl-3-propionic acid; alpha-indolyl-3-isobutyric acid; beta-indolyl - 3 - propionic acid; gamma-indolyl - 3-n-butyric acid; 2,3-dichloro-phenylsulfideacetic acid; 2,4-dichloro-phenylsulfideacetic acid; 2,5-dichlorophenylsulfideacetic acid; 3,4-dichloro-phenylsulfideacetic acid; 4-chloro-2-methyl-phenylsulfideacetic acid.

Preferred compounds useful in the practice of this invention are selected from the class consisting of beta-indolyl - 3-ethanol, 2,3,5-triiodobenzyl alcohol, and 2,4,5-trichlorophenoxy-ethanol (herein abbreviated 2,4,5 T-OH). It has been found that an aqueous pharmaceutical preparation of such a material is effective in providing protection in warm blooded animals subjected to ionizing radiation.

The compound 2,4,5 T-OH is the carbinol analogue of 2,4,5-trichlorophenoxyacetic acid and has the structure

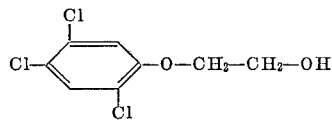

The auxin analogue of 2,4,5 T-OH; 2,4,5-trichlorophenoxyacetic acid; is a very potent plant growth regulator. The compound 2,3,5-triiodobenzyl alcohol is the carbinol analogue of 2,3,5-triiodobenzoic acid and has the structure

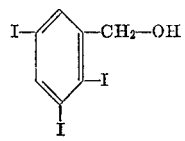

The auxin analogue of 2,3,5-triiodobenzyl alcohol; 2,3,5-triiodobenzoic acid; is a plant growth regulator having an activity as much as fifty times stronger than indolyl-3-acetic acid. The carbinol analogue 2,3,5-triiodobenzyl alcohol provides radiation protection.

It is particularly preferred that beta-indolyl-3-ethanol be employed in the practice of this invention. This compound is the carbinol analogue of indolyl-3-acetic acid which is found in certain extracts of both plant and animal tissues whereas the other cited plant growth regulators are synthetic auxins. The beta-indolyl-3-ethanol is also sufficiently soluble in the described aqueous vehicle that injections can be made with a clear solution rather than a suspension which may be subject to error if improperly administered. The beta-indolyl-3-ethanol also appears to give superior protection from ionizing radiation.

It has been observed that an intraperitoneal injection of 2,4,5 T-OH, beta indolyl-3-ethanol, or 2,3,5-triiodobenzyl alcohol produces a deep hypnotic state in warm blooded animals. It is known that anesthetized animals are less susceptible to ionizing radiation than are unanesthetized animals. It is found, however, that the radiation protection afforded by these materials is greater than that produced by mere anesthesia.

It has been found preferable to administer about 100 to about 250 milligrams of carbinol analogue of a plant growth regulator per kilogram of body weight of animal host. Lower concentrations may not be so effective in all cases and higher doses introduce the possibility of toxic side effects.

Administration is preferably with the aid of a pharmaceutical carrier. The auxin carbinols are soluble in many oily materials commonly employed as pharmaceutical carriers such as, for example, mineral oil, lard, cottonseed oil, peanut oil, sesame oil or the like, and many are insoluble in water or in aqueous vehicles such as saline, glucose, gelatin or the like or have a solubility limit too low to administer an efficacious dose of dissolved auxin carbinol. It has been found that administration of auxin compounds in solution in oily pharmaceutical carriers has a low biological effect. It is found that administration of similar concentrations of auxin carbinols in aqueous admixture demonstrates a beneficial effect. The term admixture is employed to designate a suspension, a solution, or a combination of partial suspension and partial solution where the aqueous material is in the greater quantity and the carbinol in the lesser quantity.

An auxin carbinol is suspended in the aqueous medium by a suspending, emulsifying, or surface active agent. Preferably a combination of surface active agent and emulsifier are employed to prepare a suspension of the auxin compound. Typical materials employed in the preparation of an aqueous suspension include gum arabic, methyl cellulose, acetylated monoglyceride (available commercially as Myvacet from Distillation Products Industry, a Division of Eastman Kodak Company), monomethyl glyceride, dimethyl glyceride, or a moderately high molecular weight polysorbitan (commercially available under the trade names Tween or Span from Atlas Powder Company, Wilmington, Del.). Other materials employed in the preparation of chemotherapeutic compositions containing an auxin carbinol may include glutathione, 1,2-propanediol, glycerol and glucose. Additionally the pH of the composition can be adjusted by a buffering medium such as an aqueous solution of tris(hydroxymethyl) aminomethane (tris buffer).

It is postulated that oily pharmaceutical carriers which dissolve the auxin carbinol and permit high dosages also serve as preferential solvents in animal tissue so that little of the drug can enter the cell metabolic system before degradation. Therefore, such oil carriers are relatively ineffective and tests employing such vehicles give an indication that the candidate drugs are ineffective. It is found, however, that the auxin carbinols are effective when appropriately administered, that is in an aqueous vehicle. A suspending agent or combination of suspending agents is employed to disperse an insoluble auxin carbinol and permit interaction with animal cells. Likewise it has been found valuable to provide in the pharmaceutical carrier a water soluble material in which an auxin carbinol that is insoluble in water is somewhat soluble. Thus, for example, a material such as 1,2-propanediol is employed in the vehicle to provide some solubility of the auxin carbinol in the vehicle. This probably permits more rapid entering of the auxin carbinol into the metabolic system of the animal cells.

It is preferred that the auxin carbinol be admixed in the aqueous medium with a concentration in the range of from 2 to 50 mg./ml. Lower concentrations than 2 mg./ml. require the administration of needless quantities of liquid which must be assimilated by the host. Higher concentrations that 50 mg./ml. are difficult to maintain in suspension and solution and are preferably avoided.

The following examples are given to more fully illustrate the principles of this invention.

EXAMPLE 1

Irradiation-survival tests were conducted on male C57BL/6J mice (16 to 18 grams body weight, obtained from the Roscoe B. Jackson Memorial Laboratories, Bar Harbor, Maine), to determine the efficacy of 2,4,5 T-OH in vivo.

A pharmaceutical preparation was prepared having approximately 95% distilled water. The other ingredients in the preparation were 2.5% glycerol, 2.5% 1,2-propanediol, 10 mg./ml. gum arabic, 6 mg./ml. 2,4,5 T-OH, 3 mg./ml. cysteine (alpha-amino-beta-thiolpropionic acid) and 60 mg./ml. glucose, that is, for 100 ml. of injectable admixture there are 600 mg. 2,4,5 T-OH, 2.5 ml. 1,2-propanediol, 2.5 ml. glycerol, 1 gram gum arabic, 300 mg. cysteine and 6 grams glucose.

Twenty C57BL/6J mice received one-half milliliter intraperitoneal injections of the above described 2,4,5 T-OH admixture. Thus the dose for each animal was about 150 mg. of 2,4,5 T-OH per kg. of body weight, gum arabic at 250 mg./kg., 1,2-propanediol at 625 mg./kg,. glycerol at 625 mg./kg., cysteine at 75 mg./kg. and glucose at 1500 mg./kg. A separate series of injections in ten C57BL/6J mice established that a dose of 300 mg./kg. of 2,4,5 T-OH was not lethal to the animals.

A plastic radiation chamber, 1 inch high and 8 inches in diameter, was used to restrain the mice within the geometrical limits of a homogeneous 9 inch circular field of gamma ray flux emanating from 100 cobalt-60 point sources arrayed above and below the radiation chamber. Ten animals were irradiated at one time and in each instance equal numbers of drug treated and control mice were irradiated simultaneously at a gamma dose rate of 100 to 130 roentgens per minute. Drug treated and control mice that were irradiated together, were also housed together during their survival period post-irradiation. Within 10 minutes after drug treatment the animals received 800 roentgens of gamma radiation from cobalt-60. The dose was verified by a conventional dosimeter. The control animals comprised twenty C57BL/6J mice injected intraperitoneally with one-half ml. of physiological saline less than 10 minutes before irradiation. All of the animals in this example were infected with *Pseudomonas aeruginosa*, an intestinal bacteria which exacerbates the radiation but are normally harmless.

The results of this test are illustrated in FIG. 1 wherein curve A represents the cumulative mortality of the control animals injected with physiological saline and curve B represents the cumulative mortality of animals treated with 2,4,5 T-OH as described. In the control animals the 800 roentgen dose was lethal to 100% of the animals with a mean survival time of 7.1 days. The longest any individual animal survived was 13 days. In the drug treated animals 45% of the animals survived for at least 150 days and all of those that died did so by the 50th day. Based on these observations there is an absolute protection for at least 40% of the irradiated subjects when subjected to a dose of radiation which would normally be 100% lethal. Other observations can be made from the data of FIG. 1. Thus the drug treated animals lived five times as long for a 50% mortality figure. Additionally the onset of death occurred 150% later in drug treated animals (4 days vs. 10 days), that is, there is a latent period of 150% of the saline controls. This is of importance in providing post-irradiation therapy for further reducing mortality.

EXAMPLE 2

Similar tests were conducted with C57BL/6J mice free of *Pseudomonas aeruginosa*. Twenty mice received an intraperitoneal injection of one-half ml. physiological saline for purposes of providing a control group. Another group of 20 mice received one-half ml. intraperitoneal injection of the 2,4,5 T-OH admixture set forth in Example 1. All of the mice in the drug treated and control groups received an 800 roentgen dose of gamma radiation from cobalt-60 about 10 minutes after injection in the same manner as in Example 1.

Figure 2:
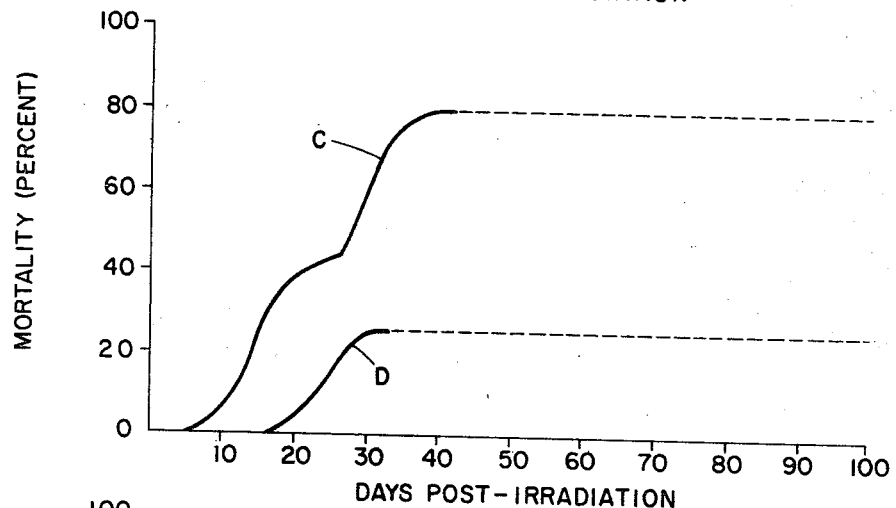

The results of these tests are set forth in FIG. 2 wherein curve C represents the cumulative mortality of saline treated control animals and curve D represents the cumulative mortality of the drug treated animals. In a 120 day time period the 800 roentgen dose was an 80% lethal dose for animals injected with saline. The same dose of radiation was only a lethal dose rate of 25% for animals treated with 2,4,5 T-OH. The latent period for mortality onset was 10 days in the control animals and 20 days in the drug treated animals or 100% increase in latent period. Absolute protection is provided such that mortality is reduced in the drug treated animals to less than one-third that in the control animals. The last death for the control animals was at 42 days, the last for the drug treated animals was at 30 days. Thus an absolute protection against radiation death is exhibited in the presence or absence of *Pseudomonas aeruginosa*.

EXAMPLE 3

In order to establish the effects of the other ingredients in the injection in addition to the 2,4,5 T-OH, a series of tests was conducted with a dose rate of 860 roentgens of gamma radiation from cobalt-60 on C57BL/6J mice as described above. Sixty control animals in three 20 mouse batches were injected with a vehicle comprising 2.5% glycerol, 2.5% 1,2-propanediol, 10 mg./ml. gum arabic and a balance of distilled water. Forty animals in two 20 mouse batches were injected with the vehicle just described with the addition of 3 mg./ml. cysteine and 60 mg./ml. glucose. An additional sixty mice in three 20 mouse batches received no injection or treatment whatsoever. Twenty animals received one-half ml. intraperitoneal injection of 2,4,5 T-OH in the admixture described in Example 1. All of the mice in these tests were selected randomly from a colony of mice that had about one-third of the population infested with *Pseudomonas aeruginosa* and about two-thirds free of this bacteria. All of the mice were given chlorinated drinking water ad libitum to suppress transfer of the bacteria.

Figure 3:
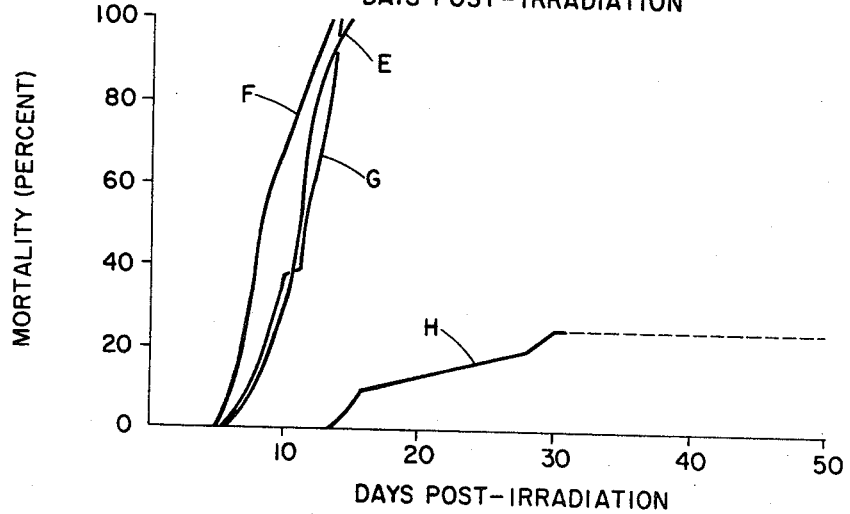

The results of these tests are illustrated in FIG. 3 wherein curve E represents the cumulative mortality of animals injected with the described vehicle, curve F represents the cumulative mortality of animals receiving no injection, curve G represents the cumulative mortality of animals injected with the described vehicle plus cysteine and glucose, and curve H represents the cumulative mortality of animals treated with the 2,4,5 T-OH admixture. The 860 roentgen exposure is a 100% lethal dose for all three control groups. In the group receiving no injection the mean survival time is 9.7 days. The mean survival time of animals injected with the vehicle above is 11.5 days. The mean survival time for animals receiving an injection of vehicle plus cysteine and glucose is 12.2 days. All of the animals in these three control groups were dead within 14 days. In the animals treated with 2,4,5 T-OH, 15 out of 20 survived at least 75 days. The latent period for mortality onset was increased from about 6 days to about 15 days. This demonstrates that the 2,4,5 T-OH is the effective material in the composition.

EXAMPLE 4

A series of tests was conducted employing beta-indolyl-3-ethanol for radiation protection. This compound is the carbinol analogue of indolyl-3-acetic acid. Male Webster white Swiss mice free of *Pseudomonas aeruginosa* were employed in this series of tests. A vehicle comprising 2.5% glycerol, 2.5% 1,2-propanediol, and 10 mg./ml. gum arabic in distilled water was employed as a vehicle for 8 mg./ml. of beta-indolyl-3-ethanol. A total of twenty mice received one-half ml. intraperitoneal injection of this admixture. Thus the 18–20 gram mice received a dose of the drug of 200 mg./kg. of body weight. It is known that two 300 mg./kg. doses on successive days are not lethal to these animals.

An additional twenty mice received a one-half ml. intraperitoneal injection of the vehicle just described plus 3 mg./ml. cysteine and 60 mg./ml. glucose; without the beta-indolyl-3-ethanol. Another twenty mice received no injection or treatment whatsoever. The twenty mice of each group were separated into four groups of five animals each for irradiation. Five drug treated animals and five control animals were simultaneously exposed to gamma radiation from cobalt-60 as above described and all animals received a 900 roentgen dose of radiation.

In both the vehicle injected control animals and the untreated control animals the onset of death occurred at ten days. After a period of 29 days 35% of the vehicle injected control anmals have died, 45% of the untreated animals have died and none of the drug treated animals have died. Thus for this time period beta-indolyl-3-ethanol has provided absolute protection for the treated animals subjected to a radiation dose that is lethal for at least 40% of the control animals. In addition, all animals injected with beta-indolyl-3-ethanol are deeply anesthetized for about one hour.

EXAMPLE 5

Test mice injected intraperitoneally with 2,3,5-triiodobenzyl alcohol in an aqueous vehicle show greater survival after exposure to ionizing radiation than similar mice not receiving the drug. These animals are also deeply anesthetized by injection of 2,3,5-triodobenzyl alcohol.

It is to be understood that the above described examples are merely illustrative of the application of the principles of this invention. Those skilled in the art may readily devise other variations that will embody the principles of this invention. It is therefore to be understood that within the scope of the appended claims the invention may be practiced otherwise than what is specifically described.

What is claimed is:

1. A chemotherapeutic composition comprising:
   an admixture in water of a carbinol analogue of a plant growth regulator selected from the class consisting of beta-indolyl-3-ethanol and 2,3,5-triiodobenzyl alcohol wherein said carbinol analogue is in a concentration in the range of from about 2 to 50 mg./ml. in water, about 60 mg./ml. glucose and about 2.5 percent 1,2-propanediol.

2. A chemotherapeutic composition comprising an admixture in water of 2,3,5-triiodobenzyl alcohol in a concentration in the range of from about 2 to 50 mg./ml. in the water.

3. A composition as defined in claim 2 further comprising about 2.5% 1,2 propanediol and;
   about 10 mg./ml. of a material selected from the class consisting of gum arabic, methyl cellulose, acetylated monoglyceride, monomethyl glyceride, dimethyl glyceride, and polysorbitan for suspending or emulsifying said carbinol analogue in water.

4. An injectable chemotherapeutic composition consisting essentially of:
   beta-indolyl-3-ethanol in the range of from about 2 to 50 mg./ml., about 2.5% 1,2 propanediol and the balance water.

5. A composition as defined in claim 4 further comprising:
   about 2.5% glycerol and;
   about 10 mg./ml. of a material selected from the class consisting of gum arabic, methyl cellulose, acetylated monoglyceride, monomethyl glyceride, dimethyl glyceride and polysorbitan for suspending and emulsifying said beta-indolyl-3-ethanol in said water.

6. A method of protecting mice from ionizing radiation comprising administering to said mice an ionizing radiation protecting amount of a carbinol analogue of a plant growth regulator selected from the class consisting of beta-indolyl-3-ethanol, 2,3,5-triiodobenzyl alcohol and 2,4,5-trichlorophenoxy-ethanol wherein said carbinol analogue is in a concentration in the range of from about 2 to 50 mg./ml. in water.

7. A method of protecting mice from ionizing radiation as defined in claim 6 wherein said carbinol analogue is injected in a dose of from 100 to 250 milligrams per kilogram of body weight of said animal.

8. A method of anesthetizing a mouse comprising parenterally administering to said mouse a carbinol analogue of a plant growth regulator selected from the class consisting of beta-indolyl-3-ethanol, 2,3,5-triiodobenzyl alcohol and 2,4,5-trichlorophenoxy ethanol in a dose of from about 100 to 250 mg./kg. of body weight of said animal.

References Cited

UNITED STATES PATENTS 2,712,990   7/1955   Swezey _____ 260—613

OTHER REFERENCES

Rodd Chemistry of Carbon Compounds, IV$^A$ Heterocyclic Compounds (1957), p. 92.

ALBERT T. MEYERS, Primary Examiner

D. R. MAHANAND, Assistant Examiner

U.S. Cl. X.R.

424—340, 343